United States Patent
Yang

(10) Patent No.: US 10,867,399 B2
(45) Date of Patent: Dec. 15, 2020

(54) IMAGE PROCESSING CIRCUIT FOR CONVOLUTIONAL NEURAL NETWORK

(71) Applicant: HIMAX TECHNOLOGIES LIMITED, Tainan (TW)

(72) Inventor: Der-Wei Yang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 248 days.

(21) Appl. No.: 16/207,184

(22) Filed: Dec. 2, 2018

(65) Prior Publication Data

US 2020/0175701 A1    Jun. 4, 2020

(51) Int. Cl.
*G06T 7/55*    (2017.01)
*G06N 3/063*   (2006.01)
*G06T 7/73*    (2017.01)

(52) U.S. Cl.
CPC ............ *G06T 7/55* (2017.01); *G06N 3/063* (2013.01); *G06T 7/74* (2017.01)

(58) Field of Classification Search
CPC .......... G06T 3/4046; G06T 7/55; G06T 7/74; H04N 19/117; H04N 19/132; H04N 19/172; H04N 19/33; H04N 19/42; H04N 19/46; H04N 19/80; G06N 3/0454; G06N 3/063
See application file for complete search history.

(56) References Cited

U.S. PATENT DOCUMENTS

| | | |
|---|---|---|
| 2018/0046907 A1 | 2/2018 | Ross et al. |
| 2018/0260683 A1 | 9/2018 | Gulland et al. |
| 2019/0130257 A1* | 5/2019 | Meyerson .............. G06N 5/003 |
| 2019/0236451 A1* | 8/2019 | Jaitly ...................... G10L 15/22 |
| 2019/0349287 A1* | 11/2019 | Chandra Sekar Rao ................... G06N 3/0472 |
| 2020/0034436 A1* | 1/2020 | Chen ...................... G06F 40/58 |
| 2020/0126185 A1* | 4/2020 | Choi .................... H04N 19/117 |

FOREIGN PATENT DOCUMENTS

| | | | |
|---|---|---|---|
| CN | 106651748 A | | 5/2017 |
| CN | 107679621 A | | 2/2018 |
| CN | 108304265 A | * | 7/2018 |
| CN | 108304265 A | | 7/2018 |
| CN | 108829610 A | | 11/2018 |
| TW | 201714091 A | | 4/2017 |
| TW | 201724029 A | | 7/2017 |
| TW | 201839763 A | | 11/2018 |
| TW | 201841131 A | | 11/2018 |

\* cited by examiner

*Primary Examiner* — Mekonen T Bekele
(74) *Attorney, Agent, or Firm* — CKC & Partners Co., LLC

(57) ABSTRACT

An image processing circuit is provided. A memory control unit first moves a reference image and parameters from a first memory to a third memory. A convolution neural network circuit obtains the parameters from the third memory. The memory control unit also moves at least one portion of the reference image from the third memory to a second memory, in which a storage capacity of the third memory is larger than that of the second memory. A depth decoder obtains the reference image from the second memory for calculating depth information according to the reference image and a structured image received from an infrared sensor, and stores the depth information into the second memory.

10 Claims, 2 Drawing Sheets

IMAGE PROCESSING CIRCUIT FOR CONVOLUTIONAL NEURAL NETWORK

BACKGROUND

Field of Invention

The present invention relates to an image processing circuit. More particularly, the present invention relates to a memory structure for a convolution neural network circuit.

Description of Related Art

Convolution neural network (CNN) has gotten lots of attention in recent years, and has been successfully applied to many technical field such as image processing. When the convolution neural network is applied to an image processing procedure, a large capacity of memory is required to store images and parameters in the CNN. Therefore, it is an issue in the art about how to devise a hardware structure for storing and moving the data.

SUMMARY

Embodiments of the present application provide an image processing circuit including the following units. A first memory is configured to store a reference image and multiple parameters. A second memory having a storage capacity that is less than a storage capacity of the first memory. A memory control unit is electrically connected to the first memory and the second memory. A convolution neural network circuit is electrically connected to the second memory. A depth decoder is electrically connected to the second memory and configured to receive a structured image from an infrared sensor. In a first mode: the memory control unit moves the reference image and the parameters from the first memory to a third memory which is electrically connected to the convolution neural network circuit, the memory control unit, and the second memory, in which a storage capacity of the third memory is larger than the storage capacity of the second memory; the convolution neural network circuit obtains the parameters from the third memory, and the memory control unit moves at least one portion of the reference image from the third memory to the second memory; and the depth decoder obtains the at least one portion of the reference image from the second memory, calculates depth information according to the at least one portion of the reference image and the structured image, and store the depth information into the second memory.

In some embodiments, the image processing circuit of claim 1 further includes a bus electrically connected to the memory control unit, the second memory and the convolution neural network circuit; and a multiplexer electrically connected to the bus, the third memory and the convolution neural network circuit. In the first mode, the convolution neural network circuit obtains the parameters from the third memory through the multiplexer.

In some embodiments, in the first mode, the memory control unit further moves a portion of the parameters from the third memory to the second memory through the bus; and when the memory control unit moves the at least one portion of the reference image from the third memory to the second memory through the bus, the convolution neural network circuit directly obtains the portion of the parameters from the second memory.

In some embodiments, the portion of the parameters corresponds to a layer of a convolutional neural network.

In some embodiments, the second memory further receives a grey level image from the infrared sensor. The convolution neural network circuit further obtains the depth information and the grey level image from the second memory, and performs an object detection process or an object recognition process according to the grey level image, the depth information, and the parameters.

In some embodiments, the at least one portion of the reference image includes pixels of at least one row of the reference image.

In some embodiments, the second memory is a static random access memory, and the third memory is a dynamic random access memory.

In some embodiments, the first memory is a flash memory.

In some embodiments, the memory control unit switches between the first mode and a second mode. In the second mode, the memory control unit moves the reference image and the parameters from the first memory to the second memory; the convolution neural network circuit obtains the parameters from the second memory; and the depth decoder obtains the reference image from the second memory, calculates the depth information according to the reference image and the structured image, and stores the depth information into the second memory.

In some embodiments, the memory control unit switches between the first mode and the second mode based on a physical switch, a detection circuit, or a firmware setting.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

First Embodiment

Figure 1:
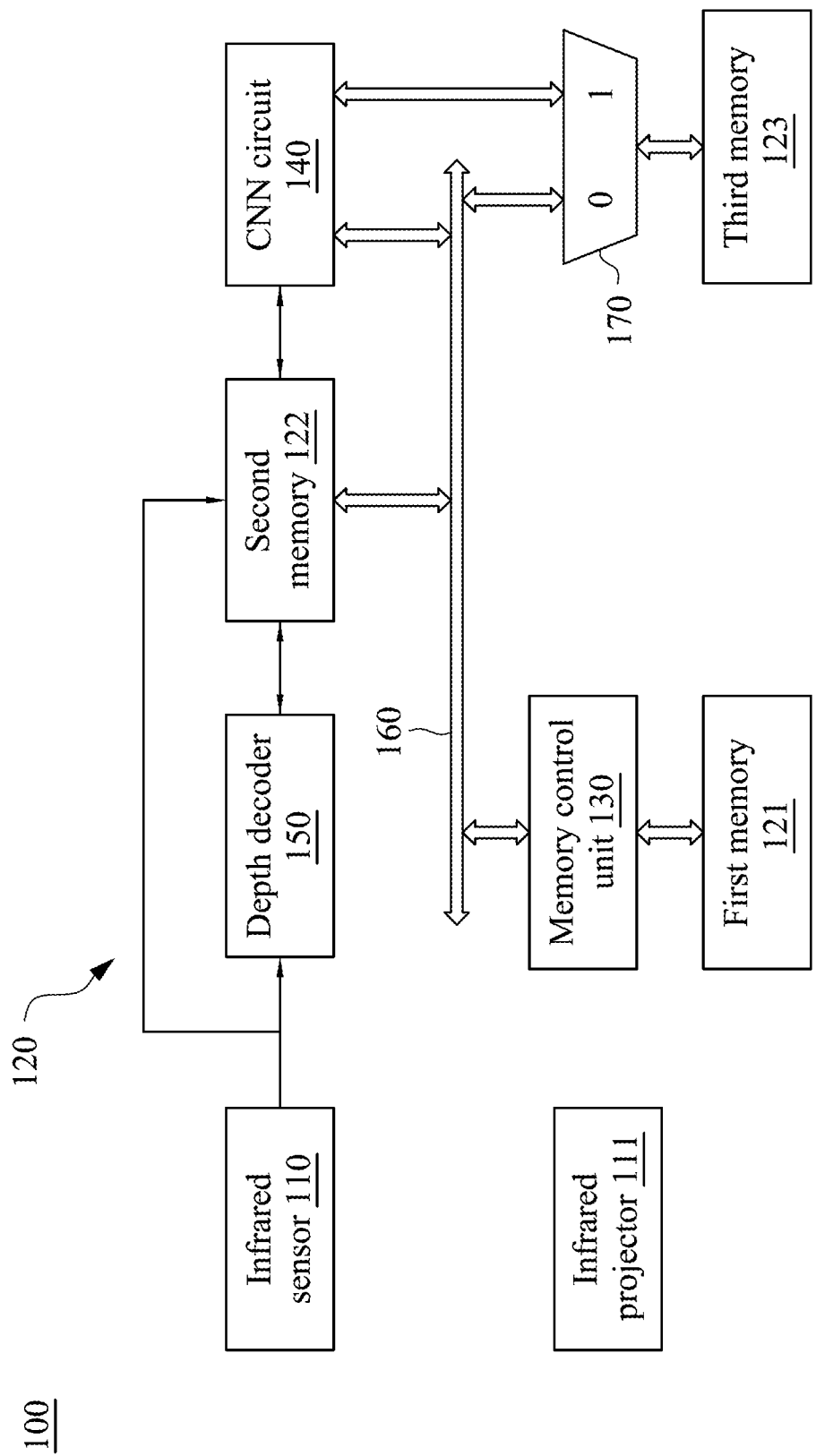
FIG. 1 is a schematic circuit diagram of an electric device in accordance with an embodiment.

FIG. 1 is a schematic circuit diagram of an electric device in accordance with an embodiment. Referring to FIG. 1, an electric device 100 includes an infrared sensor 110, an infrared projector 111, and an image processing circuit 120. The electric device 100 may be implemented as a cellphone, a tablet, a laptop, or any other suitable electric device. In some embodiments, the electric device 100 may further include other units such as a camera, etc., but the invention is not limited thereto. An image processing circuit 120 includes a first memory 121, a second memory 122, a third memory 123, a memory control unit 130, a convolutional neural network (CNN) circuit 140, a depth decoder 150, a bus 160, and a multiplexer 170. The second memory 122 is electrically connected to the infrared sensor 110, the depth decoder 150, and the convolutional neural network circuit 140. The bus 160 is electrically connected to the second memory 122, the memory control unit 130, and the multiplexer 170. The first memory 121 is electrically connected to the memory control unit 130. The multiplexer 170 is electrically connected to the CNN circuit 140 and the third memory 123.

In the embodiment, the image processing circuit 120 is used to perform an image processing procedure such as an object detection procedure or an object recognition procedure. The image processing procedure requires a depth map related to a field of the view that is calculated by two infrared images referred to a reference image and a structured image respectively. The reference image has pre-determined patterns which are also called golden patterns such as random spots or lines which are not limited in the invention. The structured image is the image sensed by the infrared sensor 110 after the infrared projector 111 projects the pre-determined pattern into the field of the view. In other words, the structured image also has the pre-determined patterns, but these pre-determined patterns may be shifted due to the depth in the field of the view. Accordingly, the depth of a particular location is calculated by the disparity between the patterns in the reference image and the structured image with respect to that location. In the embodiments, the reference image is stored in the first memory 121.

On the other hand, the CNN circuit 140 performs a CNN which generally includes multiple layers in which each layer has multiple parameters determined by previously training. In the embodiment, the parameters are also stored in the first memory 121.

In some embodiments, the storage capacities of the first memory 121 and the third memory 123 are both larger than that of the second memory 122. However, the reading speed of the second memory 122 is greater than that of the first memory 121 and the third memory 123. For example but not limited, the first memory 121 is a flash memory, the second memory 122 is a static random access memory, and the third memory 123 is a dynamic random access memory. In particular, the parameters and the reference image are first moved from the first memory 121 to the third memory 123, and then are moved from the third memory 123 to the second memory 122.

In detail, the memory control unit 130 first moves the parameters and the reference image from the first memory 121 to the third memory 123 while the multiplexer 170 selects an input terminal "0". Next, the multiplexer 170 continues to select the input terminal "0", and the memory control unit 130 moves at least a portion of the reference image from the third memory 123 to the second memory 122. The depth decoder 150 obtains the portion of the reference image from the second memory 122, and calculates depth information according to the reference image and the structured image received from the infrared sensor 110, and stores the depth information back into the second memory 122. In some embodiments, the depth decoder 150 calculates the depth information row by row, and therefore the portion of the reference image may only include one or multiple row of pixels. In other words, the memory control unit 130 may only move one or more rows of pixels of the reference image from the third memory 123 to the second memory 122, and thus the whole reference image is not loaded into the second memory 122, resulting in lower capacity requirement for the second memory 122.

On the other hand, the CNN circuit 140 may obtain the parameters from the third memory 123 by two ways. In the first way, the multiplexer 170 selects an input terminal "1", and the CNN circuit 140 obtains the parameters from the third memory 123 through the multiplexer 170. In the second way, the multiplexer 170 selects the input terminal "0", and the memory control unit 130 moves the parameters from the third memory 123 to the second memory 122. Next, the CNN circuit 140 directly obtains the parameters from the second memory 122, and meanwhile the memory control unit 130 moves the reference image from the third memory 123 to the second memory 122 through the bus 160. Consequently, the reading of the parameters and the reference image can be performed simultaneously. In some embodiments, the parameters moved into the second memory 122 correspond to one layer of CNN (not all layers), and thus the capacity requirement for the second memory 122 is reduced.

In some embodiments, the infrared sensor 110 also senses a grey level image. The grey level image does not include projected patterns and therefore its pixels only reflect the objects in the field of the view. The grey level image is transmitted to the second memory 122. The CNN circuit 140 obtains the parameters, the depth information and the grey level image from the second memory 122, and performs the object detection procedure or the object recognition procedure (e.g. face detection or face recognition) according to the grey level image, the depth information and the parameters. The content of the object detection procedure and the object recognition procedure is not limited in the invention.

Second Embodiment

Figure 2:
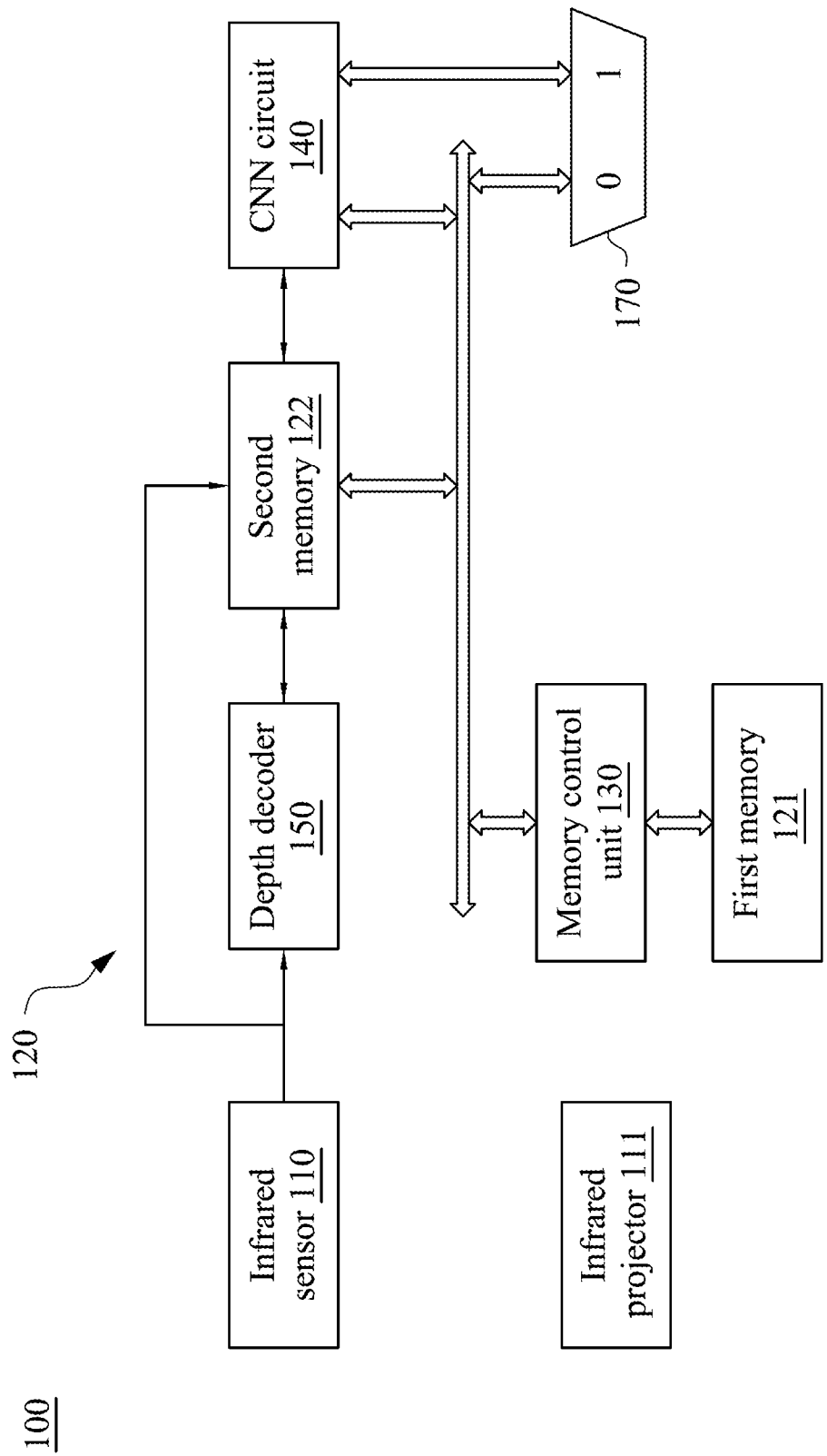
FIG. 2 is a schematic circuit diagram of an electric device in accordance with an embodiment.

FIG. 2 is a schematic circuit diagram of an electric device in accordance with an embodiment. In the embodiment of FIG. 2, the image processing circuit 120 does not include the third memory 123, and therefore the reference image and the parameters are moved from the first memory 121 to the second memory 122. The CNN circuit 140 obtains the parameters from the second memory. The depth decoder 150 obtains the reference image from the second memory 122, and calculates the depth information according to the reference image and the structured image, and stores the depth information into the second memory 122.

The second embodiment of FIG. 2 is suitable, compared to the first embodiment of FIG. 1, for images having smaller resolution, and thus all parameters and the whole reference image are stored into the second memory 122. However, the invention is not limited thereto. The first and the second embodiment may be applied to any resolution of images. Note that the difference between FIG. 1 and FIG. 2 is the third memory 123 while other units are the same. Accordingly, it is not required to modify the image processing circuit 120 significantly for applying to a different product. The first embodiment is called a first mode, the second embodiment is called a second mode, and the memory control unit 130 can switch between the first mode and the second mode. In some embodiments, a detection circuit (not shown) is disposed in the image processing circuit 120 for determining whether the third memory 123 is disposed. The memory control unit 130 would perform the first mode if the third memory 123 is disposed in the circuit, and otherwise performs the second mode. Alternatively, the memory control unit 130 may switch between the first mode and the second mode based on a physical switch or a firmware setting. The physical switch may be disposed on a circuit board or any other location. The firmware setting may be loaded into the memory control unit 130 or other controllers, which is not limited in the invention.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image processing circuit, comprising:
   a first memory, configured to store a reference image and a plurality of parameters;
   a second memory, wherein a storage capacity of the second memory is less than a storage capacity of the first memory;
   a memory control unit, electrically connected to the first memory and the second memory;
   a convolution neural network circuit, electrically connected to the second memory; and
   a depth decoder, electrically connected to the second memory and configured to receive a structured image from an infrared sensor,
   wherein in a first mode:
   the memory control unit moves the reference image and the parameters from the first memory to a third memory which is electrically connected to the convolution neural network circuit, the memory control unit, and the second memory, wherein a storage capacity of the third memory is larger than the storage capacity of the second memory;
   the convolution neural network circuit obtains the parameters from the third memory, and the memory control unit moves at least one portion of the reference image from the third memory to the second memory; and
   the depth decoder obtains the at least one portion of the reference image from the second memory, calculates depth information according to the at least one portion of the reference image and the structured image, and store the depth information into the second memory.

2. The image processing circuit of claim 1, further comprising:
   a bus, electrically connected to the memory control unit, the second memory and the convolution neural network circuit; and
   a multiplexer, electrically connected to the bus, the third memory and the convolution neural network circuit,
   wherein in the first mode, the convolution neural network circuit obtains the parameters from the third memory through the multiplexer.

3. The image processing circuit of claim 2, wherein in the first mode:
   the memory control unit further moves a portion of the parameters from the third memory to the second memory through the bus; and
   when the memory control unit moves the at least one portion of the reference image from the third memory to the second memory through the bus, the convolution neural network circuit directly obtains the portion of the parameters from the second memory.

4. The image processing circuit of claim 3, wherein the portion of the parameters corresponds to a layer of a convolutional neural network.

5. The image processing circuit of claim 1, wherein the second memory further receives a grey level image from the infrared sensor,
   the convolution neural network circuit further obtains the depth information the and the grey level image from the second memory, and performs an object detection process or an object recognition process according to the grey level image, the depth information, and the parameters.

6. The image processing circuit of claim 1, wherein the at least one portion of the reference image comprises pixels of at least one row of the reference image.

7. The image processing circuit of claim 1, wherein the second memory is a static random access memory, and the third memory is a dynamic random access memory.

8. The image processing circuit of claim 7, wherein the first memory is a flash memory.

9. The image processing circuit of claim 1, wherein the memory control unit switches between the first mode and a second mode, and in the second mode:
   the memory control unit moves the reference image and the parameters from the first memory to the second memory;
   the convolution neural network circuit obtains the parameters from the second memory; and
   the depth decoder obtains the reference image from the second memory, calculates the depth information according to the reference image and the structured image, and stores the depth information into the second memory.

10. The image processing circuit of claim 9, wherein the memory control unit switches between the first mode and the second mode according to a physical switch, a detection circuit, or a firmware setting.

* * * * *